United States Patent [19]

Lippler et al.

[11] 4,365,558

[45] Dec. 28, 1982

[54] COMBUSTIBLE OBJECTS, IN PARTICULAR COMBUSTIBLE CARTRIDGE CASES, WHICH ARE HEAT-RESISTANT

[75] Inventors: Rémy R. Lippler; André J. Mengelle, both of Bergerac; Jacques Plazanet, Mouleydier, all of France

[73] Assignee: Societe Nationale des Poudres et Explosifs, Paris, France

[21] Appl. No.: 101,201

[22] Filed: Dec. 7, 1979

[30] Foreign Application Priority Data

Dec. 15, 1978 [FR] France ................... 78 35345
Sep. 19, 1979 [FR] France ................... 79 23367

[51] Int. Cl.$^3$ .............................................. F42B 5/26
[52] U.S. Cl. ................................... 102/431; 102/290; 102/700; 149/12
[58] Field of Search ............... 102/431, 290, 700; 149/105, 12

[56] References Cited

U.S. PATENT DOCUMENTS

| | | | |
|---|---|---|---|
| 3,197,511 | 7/1965 | Tsou et al. | 149/105 |
| 3,257,948 | 6/1966 | Axelrod et al. | 102/700 |
| 3,730,094 | 5/1973 | Quinlan | 102/700 |
| 3,877,374 | 4/1975 | Cook | 102/700 |
| 3,927,616 | 12/1975 | Axelrod et al. | 102/700 |
| 4,001,126 | 1/1977 | Marion et al. | 102/290 |
| 4,034,676 | 7/1977 | Daume | 102/290 |
| 4,209,351 | 6/1980 | Pierce et al. | 102/290 |

FOREIGN PATENT DOCUMENTS 1239771 7/1971 United Kingdom .

Primary Examiner—Edward A. Miller
Attorney, Agent, or Firm—Bucknam and Archer

[57] ABSTRACT

The invention relates to the field of combustible objects used in weaponry and in particular to the field of combustible cartridge cases.

The combustible objects according to the invention are covered with a thin layer of varnish, based on an organic binder, containing hollow microbeads, the said varnish being based on a binder chosen from the group comprising chlorinated rubbers, polyvinylidene chloride, cellulosic binders, glycero-phthalic binders, polyurethane resins and polyepoxy resins. The varnish contains between 5 and 20% by weight, preferably about 10%, of hollow microspheres, relative to the dissolved polymer, and optionally between 2 and 15% by weight of an energy-producing charge having a self-ignition point above 200° C.

The combustible objects according to the invention exhibit delayed self-ignition if they are placed in contact with a hot wall, without their thermodynamic properties being adversely affected.

13 Claims, No Drawings

COMBUSTIBLE OBJECTS, IN PARTICULAR COMBUSTIBLE CARTRIDGE CASES, WHICH ARE HEAT-RESISTANT

The invention relates to the field of combustible objects used in weaponry and in particular to the field of combustible cartridge cases. The invention relates more precisely to combustible objects, in particular combustible cartridge cases, which are heat-resistant and exhibit delayed ignition when they are placed in contact with a hot wall. The combustible objects according to the invention are covered with a varnish, based on an organic binder, containing hollow microspheres.

In the field of weaponry, it is becoming increasingly common to replace constituent elements of ammunition which, until recently, were made of an incombustible solid, in particular of metal, by combustible elements which decompose by burning when the ammunition is fired and which thus exhibit the dual advantage of providing additional energy whilst at the same time relieving the firer of the need, after firing, to eject solid parts which have not participated in the firing and in the ejection of the projectile from the ammunition. Amongst the combustible objects currently used in weaponry, combustible cartridge cases are the best known; caseless ammunition, combustible detonator-holding tubes, combustible rocket fins, and the like, are also known. Combustible cartridge cases produced from a mixture of cellulose fibres and nitrocellulose are described, for example, in French Pat. No. 2,234,113 in the name of the Applicant Company.

A significant problem which presents itself in the case of the use of combustible objects in automatic weapons having a high rate of fire is the problem of the self-ignition of the combustible objects and in particular of combustible cartridge cases. In fact, in these weapons, substantial heating of the internal walls of the weapon takes place and these walls can reach high temperatures which are frequently above the self-ignition temperature of organic products, the latter temperature generally being about 250° C. At this temperature, the customary combustible objects are likely to ignite spontaneously when they are introduced into the weapon, and to cause the undesired firing of the ammunition. To solve this problem of self-ignition, combustible objects have been proposed which are made of a polymer foam such as, for example, polyurethane foam. The pores of the foam contain air which thus acts as a heat insulator. This solution seems a priori to be satisfactory, but it exhibits the following major disadvantage: the polymer foams always have a considerable thickness and therefore burn poorly, and, in order to have an adequate combustion rate, it is necessary to incorporate explosives in the said foam, which is not without danger and not suitable for all applications of combustible objects. Combustible cartridge cases produced in accordance with this technique are described, for example, in French Pat. No. 2,103,794. Another solution to the problem of self-ignition consists in enveloping those parts of the combustible object which are capable of coming into contact with a hot wall, with an insulating coating which can be, for example, a polyurethane foam. A solution of this type is described, for example, in French Pat. No. 2,294,421. Apart from the fact that this involves a technique which is relatively complicated to carry out, and hence expensive, the abovementioned disadvantages are still to be found.

The object of the present invention is to propose combustible objects, in particular combustible cartridge cases, which are heat-resistant, have delayed self-ignition in contact with a hot wall and do not exhibit the abovementioned disadvantages. The combustible objects, and in particular the combustible cartridge cases, according to the invention are characterised in that they are covered with a thin layer of varnish, based on an organic binder, containing hollow microspheres, the varnish being based on a binder chosen from the group comprising chlorinated rubbers, polyvinylidene chloride, cellulosic binders, glycero-phthalic binders, polyurethane resins and polyepoxy resins.

The invention therefore makes is possible to obtain, by means of a very simple technique, combustible objects which do not self-ignite in contact with a hot wall because it suffices to cover conventional combustible objects, in particular those obtained from a mixture of cellulose fibres and nitrocellulose in accordance with the technique of French Pat. No. 2,234,113, with a layer of varnish containing hollow microspheres. This operation can be carried out by simple dipping or by spraying with a gun. A further advantage of the invention lies in the fact that the combustion characteristics of the chosen combustible object are not modified because the thickness of the layer of varnish is negligible compared with the thickness of the combustible object itself. The technique according to the invention is therefore suitable for all the conventional combustible objects. This solution is entirely satisfactory in the case of weapons which are fired at high pressure, but in the case of weapons which are fired at low pressure, traces of unburnt residues are found in certain cases after firing, which in the long term causes fouling of the weapon.

To overcome this disadvantage, an energy-producing charge is in this case incorporated in the solution of varnish containing the hollow microspheres, which charge ensures the complete combustion of the varnish and of the microspheres at the moment of firing but does not reduce the heat-resistance of the varnish.

In general terms, the energy-producing charge must have a self-ignition point above 200° C.; the term self-ignition point is understood as meaning the decomposition temperature of the product when the latter is subjected to a uniform increase in temperature of 5° C. per minute.

Nitrated polymers or copolymers, such as, for example, dinitropolystyrene, energy-producing nitrated compounds, such as nitroguanidine, or even explosive nitrated compounds which are not hydrophilic, can be used as the energy-producing charge; in the last case, organic nitrated compounds, such as, for example, hexogen or octogen, are preferably used. For safety reasons, it is preferred to employ non-explosive nitrated compounds or nitrated polymers when manufacturing the varnish. The preparation of energy-producing charge in the solution of varnish is between 2 and 15% by weight, preferably between 3 and 10% by weight, relative to the weight of polymer constituting the base of the varnish.

A detailed description of the manner in which the invention is carried out is given below.

The combustible objects, and in particular the combustible cartridge cases, according to the invention are covered with a thin layer of varnish containing hollow microspheres. The varnish consists, in the liquid state, of a solution of polymer in a solvent, the solution containing between 5 and 20% by weight of hollow microspheres, relative to the dissolved polymer. A chlorinated rubber, polyvinylidene chloride, a cellulosic binder, a glycerophthalic binder or a polyurethane or polyepoxy resin can be used as the base of the varnish. According to a preferred variant of the invention, a polyurethane resin is used as the base of the varnish. The solvent used is a volatile solvent for the chosen polymer. If a chlorinated rubber, polyvinylidene chloride, a glycerophthalic binder or a polyurethane resin is used, a hydrocarbon, such as trichloroethylene or toluene, is preferably chosen; if a polyurethane resin, a polyepoxy resin or a cellulosic binder is used, a ketone, such as, for example, methyl ethyl ketone or methyl isobutyl ketone, is preferably chosen; if a polyurethane resin is used, it is also possible to employ a volatile ester, such as butyl acetate or ethylglycol acetate, as the solvent. The solution of varnish furthermore contains between 5 and 20% by weight, preferably about 10% by weight, of hollow microspheres, relative to the weight of polymer constituting the base of the varnish. The various hollow microspheres which already exist, such as, for example, microspheres made of uncoated glass, silvered glass, phenolic resin, polyvinylidene chloride and the like, can be used. However, the use of microspheres which might be attacked by the solvent for the varnish is avoided; thus, in the case where the liquid varnish consists of a solution of chlorinated rubber, the use of polyvinylidene chloride microspheres is avoided, glass microspheres preferably being used. The particle size of the microspheres used is preferably between 30 and 150 microns. The choice of the microspheres used is also made with allowance for the particular problems associated with the final use of the combustible object, such as, for example, erosion of the tube of the weapon, and the like.

As has already been indicated above, when the combustible object is intended for use in a weapon which is fired at low pressure, the solution of varnish additionally contains, according to a preferred embodiment of the invention, between 2 and 15% by weight of energy-producing charges, the percentages being expressed relative to the weight of polymer constituting the varnish. The energy-producing charges used are the charges listed above, but charges which are sparingly soluble or totally insoluble in the solvent used for manufacturing the varnish are preferably chosen.

The liquid varnish is then applied, by dipping or using a gun, to those surfaces of the combustible object which are capable of being placed in contact with a hot wall. The amount of liquid varnish deposited is generally between 50 and 200 g/m², depending on the application envisaged for the combustible object and depending on the exact nature of the composition of the liquid varnish, the expert himself determining the amount of varnish which he desires to deposit.

The liquid varnishes according to the invention can be applied to the various constituent materials of the customary combustible objects and especially to the mixtures of cellulose fibres and nitrocellulose fibres described in French Pat. No. 2,234,113. After the liquid varnish has been applied, it suffices to allow the solvent to evaporate in order to obtain a combustible material which exhibits delayed self-ignition if it is placed in contact with a hot wall, and the thermodynamic properties of which are not adversely affected.

The invention will be understood more clearly with the aid of the illustrative embodiments which are given below without implying a limitation.

EXAMPLE 1

8 parallelepipedal test pieces of dimensions 10×10×3.5 mm are prepared. These test pieces are composed, according to the technique of French Pat. No. 2,234,113, of a mixture of cellulose fibres and nitrocellulose fibres and correspond to the following precise composition:

| | |
|---|---|
| nitrocellulose (nitrogen level 13.35%): | 63 parts by weight |
| kraft: | 27 parts by weight |
| thermosetting acrylic resin: | 9 parts by weight |
| diphenylamine: | 1 part by weight |

A liquid varnish having the following formulation is also prepared:

| | |
|---|---|
| phenolic microspheres: | 10 parts by weight |
| Desmophen 1200: | 30 parts by weight |
| Desmophen RD 18: | 37.5 parts by weight |
| Desmodur HL: | 50 parts by weight |
| methyl isobutyl ketone: | 25 parts by weight |

The phenolic microspheres have a particle size of between 40 and 150 microns.

Desmophen 1200 is a branched polyester-triol having a level of hydroxyl groups, OH, of 2.94 equivalents per kg, and is marketed by the company Farbenfabriken BAYER AG.

Desmophen RD 18 is a branched polyester modified with fatty acids and having a level of hydroxyl groups, OH, of 3 equivalents per kg, and this product is marketed by the company Farbenfabriken BAYER AG.

Desmodur HL is a mixed isocyanurate derived from toluene diisocyanate and hexamethylene diisocyanate and having a level of NCO groups of 2.5 equivalents per kg, and is marketed by the company Farbenfabriken BAYER AG.

Four test pieces are coated with the varnish thus prepared, at a rate of 64 g/m² of liquid varnish, and the other four test pieces are not treated.

After the varnish has been dried, the treated and untreated test pieces are tested on a heating plate at various temperatures. The test pieces, under their own weight, are placed, at normal pressure, in contact with the heating plate at the temperature of the experiment, the coated face being placed against the metal in the case of the treated test pieces. The self-ignition delay of each test piece is measured. The results are as follows:

| surface condition | temperature | | | |
|---|---|---|---|---|
| | 220° C. | 240° C. | 260° C. | 280° C. |
| uncoated test piece | 80 seconds | 21 seconds | 10 seconds | 3 seconds |
| coated test piece | 102 seconds | 48 seconds | 22 seconds | 16 seconds |

It is clearly apparent from these results that the protection provided by coating makes it possible considerably to increase the self-ignition delays at between 200° and 300° C.

The experiments were repeated with test pieces coated at a rate of 185 g/m² of liquid varnish. The self-ignition delays are multiplied by three.

EXAMPLE 2

Example 1 is repeated, the phenolic microspheres being replaced by polyvinylidene chloride microbeads, and the test pieces being coated at a rate of 69.4 g/m² of liquid varnish.

The self-ignition delay of the coated test piece at 280° C. is 10 seconds.

EXAMPLE 3

This example relates to the preparation of a varnish containing an energy-producing charge.

8 parallepipedal test pieces of dimensions 10×10×3.5 mm are prepared. These test pieces are composed, according to the technique of French Pat. No. 2,234,113, of a mixture of cellulose fibres and nitrocellulose fibres and correspond to the following precise composition:

| nitrocellulose (nitrogen level 13.35%): | 63 parts by weight |
| --- | --- |
| kraft: | 27 parts by weight |
| thermosetting acrylic resin: | 9 parts by weight |
| diphenylamine: | 1 part by weight |

A liquid varnish having the following formulation is also prepared:

| phenolic microspheres: | 10 parts by weight |
| --- | --- |
| Desmophen 1200: | 30 parts by weight |
| Alkydal F 251: | 37.5 parts by weight |
| Desmodur HL: | 50 parts by weight |
| dinitropolystyrene: | 5.2 parts by weight |
| methyl isobutyl ketone: | 25 parts by weight |

The phenolic microspheres have a mean particle size of 40 microns and are marketed by the company HEXCEL-FRANCE under the trademark Rezolin.

Desmophen 1200 is a branched polyester-triol having a level of hydroxyl groups, OH, of 2.94 equivalents per kg, and is marketed by the company Farbenfabriken BAYER AG.

Alkydal F 251 is a glycero-phthalic resin containing hydroxyl groups, and this product is marketed by the company Farbenfabriken BAYER AG.

Desmodure HL is a mixed isocyanurate derived from toluene diisocyanate and hexamethylene diisocyanate, and having a level of NCO groups of 2.5 equivalents per kg, and is marketed by the company Farbenfabriken BAYER AG.

Four test pieces are coated with the varnish thus prepared, at a rate of 65 g/m² of liquid varnish, and the other four pieces are not treated.

After the varnish has been dried, the treated and untreated test pieces are tested on a heating plate at various temperatures. The test pieces, under their own weight, are placed, at normal pressure, in contact with the heating plate at the temperature of the experiment, the coated face being placed against the metal in the case of the treated test pieces. The self-ignition delay of each test piece is measured. The results are as follows:

| surface condition | temperature | | | |
| --- | --- | --- | --- | --- |
| | 220° C. | 240° C. | 260° C. | 280° C. |
| uncoated test piece | 80 seconds | 21 seconds | 10 seconds | 3 seconds |
| coated test piece | 105 seconds | 31.4 seconds | 12 seconds | 4 seconds |

EXAMPLE 4

Example 3 is repeated, using nitroguanidine as the energy-producing charge.

A liquid varnish having the following formulation is prepared:

| phenolic microspheres: | 10 parts by weight |
| --- | --- |
| Desmophen 1200: | 30 parts by weight |
| Alkydal F 251: | 37.5 parts by weight |
| Desmodur HL: | 50 parts by weight |
| nitroguanidine: | 3.9 parts by weight |
| methyl isobutyl ketone: | 25 parts by weight |

The procedure of Example 1 is followed, the coating level of the test pieces being 65 g/m² of liquid varnish. The results are as follows:

| surface condition | temperature | | | |
| --- | --- | --- | --- | --- |
| | 220° C. | 240° C. | 260° C. | 280° C. |
| uncoated test piece | 80 seconds | 21 seconds | 10 seconds | 3 seconds |
| coated test piece | 102 seconds | 33 seconds | 22 seconds | 8 seconds |

EXAMPLE 5

Example 1 is repeated, using a mixture of hexogen and dinitropolystyrene as the energy-producing charge.

A liquid varnish having the following formulation is prepared:

| phenolic microspheres: | 10 parts by weight |
| --- | --- |
| Desmophen 1200: | 30 parts by weight |
| Alkydal F 251: | 37.5 parts by weight |
| Desmodur HL: | 50 parts by weight |
| hexogen: | 15.75 parts by weight |
| dinitropolystyrene: | 4.9 parts by weight |
| methyl isobutyl ketone: | 25 parts by weight |

The procedure of Example 1 is followed, the coating level of the test pieces being 65 g/m² of liquid varnish. The results are as follows:

| surface condition | temperature | | | |
| --- | --- | --- | --- | --- |
| | 220° C. | 240° C. | 260° C. | 280° C. |
| uncoated test piece | 80 seconds | 21 seconds | 10 seconds | 3 seconds |
| coated test piece | 104 seconds | 32.4 seconds | 17 seconds | 6 seconds |

It is clearly apparent from these results that the protection provided by coating makes it possible considerably to increase the self-ignition delays at between 200° and 300° C.

Furthermore, in the case of the experiments relating to Examples 3, 4 and 5, it was found that virtually no residue from the coating remains and that the microspheres are entirely destroyed.

We claim:

1. A heat-resistant combustible object which is covered with a thin layer of varnish, which object exhibits delayed self-ignition in the temperature range of 200°–300° C., said varnish containing hollow microspheres, said varnish comprising as the basic ingredient an organic binder which consists of a polymer, which is a chlorinated rubber, polyvinylidene chloride, a cellulosic binder, a glycerophthalic binder, a polyurethane resin or a polyepoxy resin, the thickness of the layer of said varnish being neglegible when compared with the thickness of said combustible object.

2. Combustible object according to claim 1, wherein said varnish contains between 5 and 20% by weight of hollow microspheres, relative to the weight of polymer constituting the base of the varnish.

3. Combustible object according to claim 2, wherein said varnish contains about 10% by weight of hollow microspheres.

4. Combustible object according to claim 1, wherein the particle size of the said hollow microspheres is between 30 and 150 microns.

5. Combustible object according to claim 1, wherein said varnish contains between 2 and 15% by weight, relative to the weight of polymer constituting the base of the said varnish, of an energy-producing charge which has a self-ignition point above 200° C. and is a member selected from the group consisting of nitrated polymers, nitrated copolymers, nitroguanidine and non-hydrophilic nitrated explosives.

6. Combustible object according to claim 5, wherein a nitrated polymer which is dinitropolystyrene is said energy-producing charge.

7. Combustible object according to claim 5, wherein said energy-producing charge is a non-hydrophilic, organic nitrated explosive.

8. Combustible object according to claim 7, wherein said energy-producing charge is hexogen or octogen.

9. The combustible object according to claim 1, which is a combustible cartridge case, caseless ammunition, a combustible detonator holding tube or a combustible rocket fin.

10. The combustible object according to claim 1 wherein said combustible object is made from a mixture of cellulose fibers and nitrocellulose.

11. The combustible object according to claim 1 wherein said microspheres are made of a substance which is inert to any solvent used in applying the varnish.

12. The combustible object according to claim 10 wherein said hollow microspheres are phenolic microspheres or polyvinylidene chloride microspheres.

13. The combustible object according to claim 12 wherein said combustible object consists essentially of nitrocellulose cellulose fibers and a thermosetting acrylic resin.

* * * * *